United States Patent
Ikuno

(10) Patent No.: US 10,526,226 B2
(45) Date of Patent: Jan. 7, 2020

(54) ULTRAPURE WATER PRODUCTION APPARATUS AND ULTRAPURE WATER PRODUCTION METHOD

(71) Applicant: KURITA WATER INDUSTRIES LTD., Tokyo (JP)

(72) Inventor: Nozomu Ikuno, Tokyo (JP)

(73) Assignee: KURITA WATER INDUSTRIES LTD., Tokyo (JP)

(*) Notice: Subject to any disclaimer, the term of this patent is extended or adjusted under 35 U.S.C. 154(b) by 0 days.

(21) Appl. No.: 15/536,510

(22) PCT Filed: Dec. 18, 2015

(86) PCT No.: PCT/JP2015/085526
§ 371 (c)(1),
(2) Date: Jun. 15, 2017

(87) PCT Pub. No.: WO2016/098891
PCT Pub. Date: Jun. 23, 2016

(65) Prior Publication Data
US 2017/0327396 A1    Nov. 16, 2017

(30) Foreign Application Priority Data

Dec. 19, 2014    (JP) ................................. 2014-256939

(51) Int. Cl.
| | |
|---|---|
| *C02F 9/00* | (2006.01) |
| *B01D 61/08* | (2006.01) |
| *B01D 61/58* | (2006.01) |
| *C02F 1/20* | (2006.01) |
| *C02F 1/32* | (2006.01) |
| *C02F 1/42* | (2006.01) |
| *B01D 19/00* | (2006.01) |
| *B01D 61/02* | (2006.01) |
| *C02F 1/44* | (2006.01) |
| *C02F 103/04* | (2006.01) |
| *B01D 15/36* | (2006.01) |
| *C02F 101/30* | (2006.01) |

(52) U.S. Cl.
CPC ............. *C02F 9/00* (2013.01); *B01D 15/362* (2013.01); *B01D 15/363* (2013.01); *B01D 19/0031* (2013.01); *B01D 61/025* (2013.01); *B01D 61/08* (2013.01); *B01D 61/58* (2013.01); *C02F 1/20* (2013.01); *C02F 1/32* (2013.01); *C02F 1/42* (2013.01); *B01D 2311/2619* (2013.01); *B01D 2311/2623* (2013.01); *B01D 2311/2653* (2013.01); *C02F 1/441* (2013.01); *C02F 2001/422* (2013.01); *C02F 2001/425* (2013.01); *C02F 2101/30* (2013.01); *C02F 2103/04* (2013.01)

(58) Field of Classification Search
None
See application file for complete search history.

(56) References Cited

U.S. PATENT DOCUMENTS

| | | | |
|---|---|---|---|
| 5,811,012 A | | 9/1998 | Tanabe et al. |
| 5,954,965 A | * | 9/1999 | Kubota .................... C02F 1/42 |
| | | | 210/638 |
| 2006/0027457 A1 | * | 2/2006 | Sato ....................... B01D 61/48 |
| | | | 204/524 |
| 2010/0187175 A1 | * | 7/2010 | Kolios .................... C01B 11/20 |
| | | | 210/638 |

FOREIGN PATENT DOCUMENTS

| | | |
|---|---|---|
| CN | 1130896 A | 9/1996 |
| CN | 1408653 A | 4/2003 |
| CN | 201634548 U | 11/2010 |
| JP | H04-108587 A | 4/1992 |
| JP | H05-253568 A | 10/1993 |
| JP | H07-075780 A | 3/1995 |
| JP | H07-124594 A | 5/1995 |
| JP | H10-085740 A | 4/1998 |
| JP | H10-137750 A | 5/1998 |
| JP | H10-180252 A | 7/1998 |
| JP | H10-180254 A | 7/1998 |
| JP | 2003-266097 A | 9/2003 |
| JP | 2004-025184 A | 1/2004 |
| JP | 3826690 B2 * | 9/2006 |
| JP | 2011-045824 A | 3/2011 |
| JP | 2012-205989 A | 10/2012 |
| JP | 2012-245439 A | 12/2012 |
| JP | 2013-255864 A | 12/2013 |
| JP | 2015-020131 A | 2/2015 |

OTHER PUBLICATIONS

JP 3826690 Machine Translation—Espacenet translation of JP 3826690 Description (Year: 2006).*
Nitto Denko—SWC4+ Membrane Element sheet—Hydronautics, Nov. 3, 2015 (Year: 2015).*
China Patent Office, "Office Action for Chinese Patent Application No. 201580067856.3," dated Mar. 7, 2018.
Zhang, X. et al., "Principles and Processes of Physicochemical Treatment of Water and Wastewater," Series Textbook of water treatment engineering, Mar. 31, 2011, p. 293, Chapter 10, Tsinghua University Press, Beijing, China.
Haiqin, Y. et al., "Film Technology and Its Application in Water Treatment," Cataloging in Publication CIP data authorization, Sep. 30, 2011, p. 230, Chapter 11, China Water & Power Press, Beijing, China.

(Continued)

*Primary Examiner* — Bradley R Spies
(74) *Attorney, Agent, or Firm* — Manabu Kanesaka

(57) ABSTRACT

The present invention provides an apparatus and method for producing ultrapure water of extremely high purity that sufficiently meets the requirement for its quality at low production cost with reduced footprint. The apparatus for producing ultrapure water includes a pretreatment system, a primary water purification system, and a subsystem, wherein the primary water purification system includes a high-pressure reverse osmotic membrane separation unit, a degassing unit, an ultraviolet oxidation unit, and an ion-exchange unit in this order.

11 Claims, 1 Drawing Sheet

(56) References Cited

OTHER PUBLICATIONS

PCT/ISA/237, "Written Opinion of the International Searching Authority for International Application No. PCT/JP2015/085526," dated Mar. 15, 2016.
PCT/ISA/210, "International Search Report for International Application No. PCt/JP2015/085526", dated Mar. 15, 2016.

\* cited by examiner

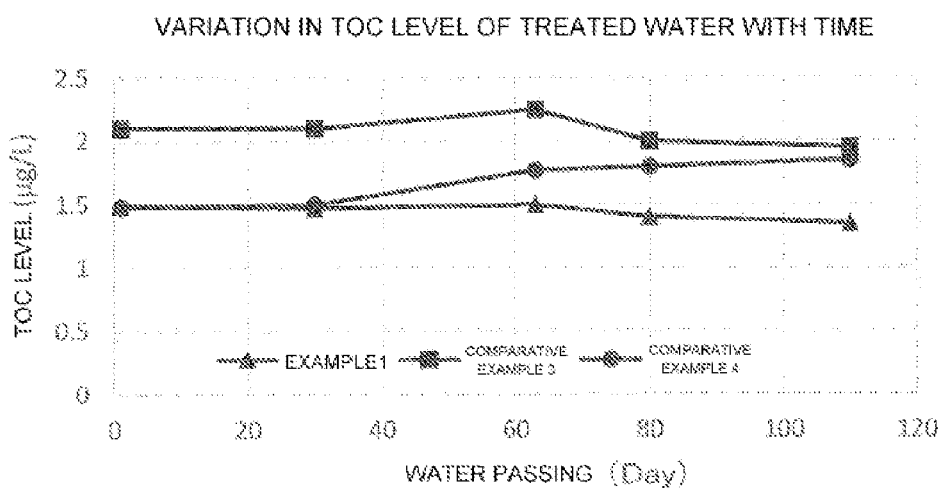

ULTRAPURE WATER PRODUCTION APPARATUS AND ULTRAPURE WATER PRODUCTION METHOD

RELATED APPLICATIONS

The present application is National Phase of International Application No. PCT/JP2015/085526 filed Dec. 18, 2015, and claims priority from Japanese Application No. 2014-256939, filed Dec. 19, 2014, the disclosure of which is hereby incorporated by reference herein in its entirety.

TECHNICAL FIELD

The present invention relates to an apparatus for producing ultrapure water and a method for producing ultrapure water.

BACKGROUND ART

A large amount of ultrapure water used as cleaning water in the production of electronic devices (in particular, semiconductor devices) is produced through treatment of raw water (e.g., industrial water, tap water, well water, or used ultrapure water discharged from electronic device plants) by an ultrapure water producing system including a pretreatment system, a primary water purification system, and a subsystem.

For example, PTL 1 discloses an apparatus for producing ultrapure water including a primary water purification system and a subsystem for treating the water from the primary water purification system, at least the primary water purification system including a reverse osmotic membrane separation unit, wherein the reverse osmotic membrane separation unit installed in the primary water purification system is a high-pressure reverse osmotic membrane separation unit installed in a single stage. PTL 2 discloses an apparatus for producing ultrapure water including a pretreatment system, a primary water purification system for treating the water treated by the pretreatment system to prepare primary pure water, and a subsystem for treating the primary pure water, wherein the primary water purification system includes a reverse osmotic membrane separation unit, a degassing unit, an electrodeionization unit, an ultraviolet oxidation unit, and a non-recycle ion-exchange unit in this order.

PTL 3 discloses an apparatus for producing ultrapure water including a primary water purification system and a secondary water purification system, wherein the primary water purification system includes a combination of a two-bed three-tower ion-exchange unit, a reverse osmotic membrane unit, an ultraviolet irradiation unit having a low-pressure ultraviolet lamp emitting ultraviolet rays of 180 to 190 nm, and a mixed-bed ion-exchange unit, the combination being disposed along a flow channel, and the secondary water purification system includes at least one combination of an ultraviolet irradiation unit having a low-pressure ultraviolet lamp emitting ultraviolet rays of 180 to 190 nm and a mixed-bed ion-exchange unit, the combination being disposed along a flow channel.

PTL 4 discloses an apparatus for producing ultrapure water including a pretreatment system, a primary water purification system, and a secondary water purification system, wherein each of the primary and secondary water purification systems includes at least one combination of an ultraviolet irradiation unit having a low-pressure ultraviolet lamp emitting ultraviolet rays of 180 to 190 nm and a mixed-bed ion-exchange unit, the combination being disposed along a flow channel.

CITATION LIST

Patent Literature

PTL 1: Japanese Unexamined Patent Application Publication No. 2012-245439
PTL 2: Japanese Unexamined Patent Application Publication No. 2003-266097
PTL 3: Japanese Unexamined Patent Application Publication No. 2004-25184
PTL 4: Japanese Unexamined Patent Application Publication No. H07-75780

SUMMARY OF INVENTION

Technical Problem

In recent years, an increasing demand has arisen for an improvement in the quality of ultrapure water used for cleaning electronic devices (e.g., semiconductor devices) in association with an increase in integration density of such devices or a reduction in size of circuit patterns. In the aforementioned apparatus or system for producing ultrapure water, the primary water purification system determines the quality of water at the point of use and the stability of water quality. In a common primary water purification system, the reverse osmotic membrane separation unit, the degassing unit, and the ion-exchange unit are each installed in a single stage. Such a common primary water purification system, however, cannot meet an increasing demand for an improvement in the quality of water. Thus, advanced semiconductor plants have recently developed primary water purification systems (A) to (C) described below, each including multi-stage reverse osmotic membrane separation units and/or ion-exchange units (towers) for enhancing the purity of ultrapure water.

(A) A multistage RO system including multiple reverse osmotic membrane (RO membrane) separation units In detail, system (A) includes a reverse osmotic membrane (RO membrane) separation unit, a mixed-bed ion-exchange unit (tower) (MB), an ultraviolet sterilization unit (UVst), a reverse osmotic membrane (RO membrane) separation unit, an ultraviolet oxidation unit (UVox), a non-recycle ion-exchange unit (tower), and a degassing unit (MDG) in this order (the number of constitutive units: 7).

(B) A multistage ion-exchange system including multiple cation-exchange and anion-exchange towers In detail, system (B) includes a cation-exchange resin (H1) unit (tower), a decarbonation tower, an anion-exchange resin (OH1) unit (tower), a cation-exchange resin (H2) unit (tower), an anion-exchange resin (OH2) unit (tower), an ultraviolet sterilization unit (UVst), a reverse osmotic membrane (RO membrane) separation unit, a degassing unit (MDG), an ultraviolet oxidation unit (UVox), and a non-recycle ion-exchange unit (tower) in this order (the number of constitutive units: 10).

Alternatively, system (B) includes a cation-exchange resin (H1) unit (tower), a decarbonation tower, an anion-exchange resin (OH1) unit (tower), an ultraviolet sterilization unit (UVst), a reverse osmotic membrane (RO membrane) separation unit, an ultraviolet oxidation unit (UVox), a mixed-bed ion-exchange unit (tower) (MB), and a non-recycle ion-exchange unit (tower) in this order (the number of constitutive units: 8).

(C) A multistage electric reusable ion-exchange water purification (CDI) system including multiple electric reusable ion-exchange units.

In detail, system (C) includes a reverse osmotic membrane (RO membrane) separation unit, a reverse osmotic membrane (RO membrane) separation unit, a degassing unit (MDG), an ultraviolet oxidation unit (UVox), a multistage electrically reusable ion-exchange water purification unit (CDI), and a multistage electrically reusable ion-exchange water purification unit (CDI) in this order (the number of constitutive units: 6).

In general, the reverse osmotic membrane (RO membrane) separation unit used in the primary water purification systems (A) to (C) is an ultralow-pressure reverse osmotic membrane (RO membrane) separation unit (standard operating pressure: 0.75 MPa).

The term "unit" as used herein refers to a unit capable of one or more treatments (e.g., desalination, degassing, and removal of organic substances) that are mainly performed in the primary water purification system. The term "number of constitutive units" refers to the number of units installed in, for example, the primary water purification system.

If raw water (e.g., industrial water, tap water, well water, or used ultrapure water discharged from electronic device plants) is treated by a pretreatment system and the pretreated water is then treated by any of the aforementioned primary water purification systems (A) to (C), the resultant water (the water discharged through the outlet of the primary water purification system) exhibits high quality; i.e., a specific resistance of 18 MΩcm or more, a TOC concentration of 2 μg/L or less, a boron (B) concentration of 1 ng/L or less, and a silica ($SiO_2$) concentration 0.1 μg/L or less.

Unfortunately, these aforementioned primary water purification systems (A) to (C), which include a large number of constitutive units (6 to 10), require a large footprint, high facility cost or initial cost, and high running cost.

In the future, higher quality will be required for ultrapure water; hence the number of units will increase in the primary water purification system.

The present invention has been made in light of the aforementioned situations. An object of the present invention is to provide an apparatus and method for producing ultrapure water of extremely high purity that sufficiently meets the requirement for its quality at low production cost with reduced footprint.

Solution to Problem

The present inventor has found that the installation of adequate constitutive units in an appropriate order in a primary water purification system of an apparatus for producing ultrapure water leads to a reduction in number of the units and low-cost production of ultrapure water of extremely high purity that sufficiently meets the requirement for its quality. The present invention has been accomplished on the basis of this finding.

Accordingly, the present invention provides an apparatus for producing ultrapure water comprising a four-unit primary water purification system comprising a high-pressure reverse osmotic membrane separation unit, a degassing unit, an ultraviolet oxidation unit, and a reusable ion-exchange unit in this order. The present invention also provides a method for producing ultrapure water involving treatment of water in a primary water purification system, the method comprising the steps of passing water through a high-pressure reverse osmotic membrane separation unit; degassing the water from the membrane separation unit; decomposing organic substances contained in the degassed water at an ultraviolet oxidation unit; and treating the water after decomposition of the organic substances at an ion-exchange unit.

In specific, the present invention provides an apparatus for producing ultrapure water comprising a pretreatment system, a primary water purification system, and a subsystem, wherein the primary water purification system comprises a high-pressure reverse osmotic membrane separation unit, a degassing unit, an ultraviolet oxidation unit, and an ion-exchange unit in this order.

The high-pressure reverse osmotic membrane separation unit preferably exhibits a pure water flux of 0.6 to 1.3 $m^3/m^2$/day under an effective transmembrane pressure of 2.0 MPa and 25° C.

The ion-exchange unit is preferably any one of the following reusable ion-exchange units A) to D):

A) a two-bed two-tower reusable ion-exchange unit comprising a cation-exchange tower filled with a strong-acid cation-exchange resin and an anion-exchange tower filled with a strong-base anion-exchange resin, the towers being connected in series;

B) a two-bed one-tower reusable ion-exchange unit comprising a single tower filled with a strong-acid cation-exchange resin and a strong-base anion-exchange resin such that the resins are placed in different beds;

C) a mixed-bed reusable ion-exchange unit comprising a single tower filled with a homogeneous mixture of a strong-acid cation-exchange resin and a strong-base anion-exchange resin; and D) a reusable ion-exchange unit comprising one or more electric reusable deionization units connected in series.

The present invention also provides a method for producing ultrapure water, the method comprising treating raw water at a pretreatment system, and treating the pretreated water at a primary water purification system and then at a subsystem, wherein the treatment at the primary water purification system comprises the steps of passing the pretreated water through a high-pressure reverse osmotic membrane separation unit; degassing the water passing through the membrane separation unit; decomposing organic substances contained in the degassed water at an ultraviolet oxidation unit; and treating the water after the decomposition of organic substances at an ion-exchange unit.

Advantageous Effects

The present invention can provide an apparatus and method for producing ultrapure water of extremely high purity that sufficiently meets the requirement for its quality at low production cost with reduced footprint.

BRIEF DESCRIPTION OF DRAWINGS

FIG. 1 is a graph illustrating a variation in TOC level of water with time, the water being treated with a primary water purification system in Example 1 or Comparative Example 3 or 4.

DESCRIPTION OF EMBODIMENTS

Embodiments of the present invention will now be described. The following embodiments are merely typical embodiments of the present invention and should not be construed to limit the invention.

1. Apparatus for Producing Ultrapure Water

The apparatus for producing ultrapure water according to an embodiment of the present invention includes a pretreatment system, a primary water purification system, and a subsystem, wherein the primary water purification system includes a high-pressure reverse osmotic membrane separation unit, a degassing unit, an ultraviolet oxidation unit, and an ion-exchange unit in this order. The apparatus for producing ultrapure water according to the embodiment can produce ultrapure water of extremely high purity that sufficiently meets the requirement for its quality with reduced footprint. The apparatus can produce ultrapure water with reduced facility cost or initial cost and running cost.

<Primary Water Purification System>

The primary water purification system of the apparatus for producing ultrapure water according to the embodiment of the present invention includes only four units; i.e., the high-pressure reverse osmotic membrane separation unit, the degassing unit, the ultraviolet oxidation unit, and the ion-exchange unit in this order. The primary water purification system involves the removal of ions and organic components contained in the water obtained through treatment of raw water (e.g., industrial water, tap water, well water, or used ultrapure water discharged from electronic device plants) at the pretreatment system. Although the primary water purification system includes only four units, the apparatus for producing ultrapure water according to the embodiment of the present invention can produce ultrapure water having a quality equal to or higher than that of ultrapure water produced by, for example, an apparatus for producing ultrapure water including any one of the aforementioned primary water purification systems (A) to (C); i.e., a primary water purification system including multiple reverse osmotic membrane separation units and/or multiple ion-exchange units (towers). Thus, the ultrapure water produced by the apparatus for producing ultrapure water according to the embodiment of the present invention exhibits extremely high purity and sufficiently satisfies the required quality.

It can be determined whether the ultrapure water produced by the apparatus for producing ultrapure water according to the embodiment of the present invention sufficiently satisfies the required quality as follows: Raw water (e.g., industrial water, tap water, well water, or used ultrapure water discharged from electronic device plants) is treated by the pretreatment system, and the pretreated water is then treated by the primary water purification system of the apparatus for producing ultrapure water according to the embodiment of the present invention. Thereafter, it is determined whether the resultant water (the water discharged through the outlet of the primary water purification system) exhibits a specific resistance of 18 M$\Omega$cm or more, a total organic carbon (TOC) concentration of 2 µg/L or less, a boron (B) concentration of 1 ng/L or less, and a silica ($SiO_2$) concentration 0.1 µg/L or less. Thus, if the water treated by the primary water purification system of the apparatus for producing ultrapure water according to the embodiment of the present invention exhibits the aforementioned quality, the ultrapure water produced through treatment at the below-described subsystem exhibits extremely high purity and sufficiently satisfies the required quality.

The high-pressure reverse osmotic membrane separation unit according to the embodiment of the present invention removes salts and organic substances. The high-pressure reverse osmotic membrane separation unit has been used for seawater desalination, and the high-pressure reverse osmotic membrane has a skin layer denser than that of a low-pressure or ultralow-pressure reverse osmotic membrane used in the primary water purification system of a traditional apparatus for producing ultrapure water. Thus, the volume per unit operating pressure of water penetrating through the high-pressure reverse osmotic membrane is smaller than that of the low-pressure or ultralow-pressure reverse osmotic membrane. The high-pressure reverse osmotic membrane, however, can remove weak electrolytes and uncharged components (e.g., boron, silica, and uncharged organic substances) at high rates. The high-pressure reverse osmotic membrane separation unit exhibits a small volume per unit operating pressure of water penetrating through the membrane as described above, and exhibits a pure water flux of 0.6 to 1.3 $m^3/m^2$/day under an effective transmembrane pressure of 2.0 MPa and 25° C. and an NaCl removal rate of 99.5% or more. The pure water flux or the NaCl removal rate may be any value that can achieve the objects and advantageous effects of the present invention. As used herein, the effective transmembrane pressure corresponds to a pressure calculated by subtracting the osmotic pressure difference and the secondary pressure from the average operating pressure, and the NaCl removal rate is determined with an aqueous NaCl solution having a NaCl concentration of 32,000 mg/L at 25° C. and an effective transmembrane pressure of 2.7 MPa. The high-pressure reverse osmotic membrane may be in any form that can achieve the objects and advantageous effects of the present invention. For example, the high-pressure reverse osmotic membrane may be in a spiral, hollow fiber, or flat form.

In the embodiment of the present invention, the high-pressure reverse osmotic membrane separation unit is installed for the following reasons: The high-pressure reverse osmotic membrane has a high degree of crosslinking in the polyamide layer responsible for desalination or removal of organic substances; hence it exhibits a desalination rate and an organic removal rate much higher than those of a traditional ultralow-pressure or low-pressure reverse osmotic membrane (RO membrane) used in the art as illustrated in Table 1 below. Thus, the use of the high-pressure reverse osmotic membrane can significantly reduce the load to be applied to the downstream unit. In addition, the quality of water prepared by single-stage treatment with the high-pressure reverse osmotic membrane is comparable to that of water prepared by multistage treatment (in particular, two-stage treatment) with a traditional ultralow-pressure or low-pressure reverse osmotic membrane (RO membrane).

TABLE 1

Comparison of removal rates of several substances between high-pressure reverse osmotic membrane (RO membrane) and ultralow-pressure reverse osmotic membrane (RO membrane)

| Substance | High-pressure RO membrane | Ultralow-pressure RO membrane |
| --- | --- | --- |
| Desalination rate | 99.8% or more | 99.5% or more |
| IPA | 98% | 92% |
| B | 90% | 65% |
| Urea | 85% | 40% |
| $F^-$ | 99% | 92% |
| $NO_3^-$ | 99% | 95% |

*) The pH of water fed to reverse osmotic membrane (RO membrane) is 7.

The degassing unit according to the embodiment of the present invention removes inorganic carbon (IC) and dissolved oxygen. The degassing unit is installed downstream of the high-pressure reverse osmotic membrane separation unit for the following reasons: If the degassing unit were installed upstream of the high-pressure reverse osmotic membrane separation unit, the degassing membrane or filler (for vacuum degassing) disposed in the degassing unit would be contaminated with suspended substances, Al, or $SiO_2$ contained in raw water, resulting in reduced degassing efficiency. Since the aforementioned suspended substances, Al, or $SiO_2$ can be removed at the high-pressure reverse osmotic membrane, a reduction in degassing efficiency can be prevented by passing the water treated with the separation unit through the degassing unit.

The degassing unit is installed upstream of the ion-exchange unit and the ultraviolet oxidation unit for the following reasons: Inorganic carbon (IC), which can be removed at the degassing unit, acts as a radical scavenger in the ultraviolet oxidation unit and applies anionic load onto the ion-exchange unit. Excess dissolved oxygen, which can be removed at the degassing unit, acts as a radical scavenger in the ultraviolet oxidation unit as in the case of inorganic carbon (IC), and causes the oxidation and degradation of the resin contained in the ion-exchange unit. Thus, the degassing unit should be installed upstream of the ultraviolet oxidation unit and the ion-exchange unit. The degassing unit may be of any type that can achieve the objects and advantageous effects of the present invention. Examples of the degassing unit include decarbonators, membrane degasifiers, vacuum degasifiers, nitrogen degassers, and catalytic-resin-containing deoxidization units.

The ultraviolet oxidation unit is installed downstream of the degassing unit and upstream of the ion-exchange unit (tower) for the following reasons: In the ultraviolet oxidation unit, organic substances contained in water (water to be treated) are decomposed into $CO_2$ and organic acids by the oxidizing ability of OH radicals. $CO_2$ or organic acids generated in the ultraviolet oxidation unit can be removed at the downstream ion-exchange unit (tower).

The ultraviolet oxidation unit according to the embodiment of the present invention may be of any type that can emit light of 185 nm and achieve the objects and advantageous effects of the present invention. A preferred embodiment of the present invention involves the use of an ultraviolet oxidation unit including a lamp and outer tube composed of synthetic quartz having very low impurity content from the viewpoint of decomposition efficiency of organic substances.

The ion-exchange unit according to the embodiment of the present invention removes salts and charged organic substances. The ion-exchange unit may be of any type that can achieve the objects and advantageous effects of the present invention. The ion-exchange unit according to the embodiment of the present invention is preferably a reusable ion-exchange unit (tower) or a non-recycle ion-exchange unit (tower). Examples of the reusable ion-exchange unit (tower) include A) a two-bed two-tower reusable ion-exchange unit composed of a cation-exchange tower filled with a strong-acid cation-exchange resin and an anion-exchange tower filled with a strong-base anion-exchange resin connected in series; B) a two-bed one-tower reusable ion-exchange unit composed of a single tower filled with a strong-acid cation-exchange resin and a strong-base anion-exchange resin such that the resins are placed in different beds; C) a mixed-bed reusable ion-exchange unit composed of a single tower filled with a homogeneous mixture of a strong-acid cation-exchange resin and a strong-base anion-exchange resin; and D) a reusable ion-exchange unit composed of one or more electric reusable deionization units connected in series.

<Pretreatment System>

The pretreatment system of the apparatus for producing ultrapure water according to the embodiment of the present invention includes a unit for flocculation and filtration, a unit for flocculation, dissolved air flotation (precipitation), and filtration, or a membrane separation unit. The pretreatment system may include any other unit that is generally used for removal of suspended substances or colloidal substances. The pretreatment system involves removes suspended substances or colloidal substances contained in raw water (e.g., industrial water, tap water, well water, or used ultrapure water discharged from electronic device plants).

<Subsystem>

The subsystem of the apparatus for producing ultrapure water according to the embodiment of the present invention includes a low-pressure ultraviolet oxidation unit, an ion-exchange unit, and an ultrafiltration unit. The subsystem may include any other unit. The subsystem enhances the purity of ultrapure water. The low-pressure ultraviolet oxidation unit involves the decomposition and removal of organic substances in water by OH radicals generated through absorption of 185-nm light emitted from a low-pressure ultraviolet lamp. The ion-exchange unit of the subsystem removes organic acids generated in the low-pressure ultraviolet oxidation unit or a small amount of ions generated in piping. The ultrafiltration unit installed at the end of the subsystem removes microparticles discharged from piping or the ion-exchange unit.

2. Method for Producing Ultrapure Water

The method for producing ultrapure water according to the embodiment of the present invention involves treating raw water at a pretreatment system, and treating the pretreated water at a primary water purification system and then at a subsystem, wherein the treatment at the primary water purification system involves the steps of passing the pretreated water through a high-pressure reverse osmotic membrane separation unit; degassing the water passing through the membrane separation unit; decomposing organic substances contained in the degassed water at an ultraviolet oxidation unit; and treating the water after the decomposition of organic substances at an ion-exchange unit. The method for producing ultrapure water according to the embodiment can produce ultrapure water of extremely high purity that sufficiently meets the requirement for its quality with reduced footprint. The method can produce ultrapure water with reduced facility cost or initial cost and running cost.

The embodiments of the present invention include the following aspects [1] to [4]:

Aspect [1]: An apparatus for producing ultrapure water comprising a pretreatment system, a primary water purification system, and a subsystem, wherein the primary water purification system comprises a high-pressure reverse osmotic membrane separation unit, a degassing unit, an ultraviolet oxidation unit, and an ion-exchange unit in this order.

Aspect [2]: The apparatus according to Aspect [1], wherein the high-pressure reverse osmotic membrane separation unit exhibits a pure water flux of 0.6 to 1.3 $m^3/m^2/day$ under an effective transmembrane pressure of 2.0 MPa and 25° C.

Aspect [3]: The apparatus according to Aspect [1] or [2], wherein the ion-exchange unit is any one of the following reusable ion-exchange units A) to D):

A) a two-bed two-tower reusable ion-exchange unit comprising a cation-exchange tower filled with a strong-acid cation-exchange resin and an anion-exchange tower filled with a strong-base anion-exchange resin, the towers being connected in series;

B) a two-bed one-tower reusable ion-exchange unit comprising a single tower filled with a strong-acid cation-exchange resin and a strong-base anion-exchange resin such that the resins are placed in different beds;

C) a mixed-bed reusable ion-exchange unit comprising a single tower filled with a homogeneous mixture of a strong-acid cation-exchange resin and a strong-base anion-exchange resin; and D) a reusable ion-exchange unit comprising one or more electric reusable deionization units connected in series.

Aspect [4]: A method for producing ultrapure water, the method comprising treating raw water at a pretreatment system, and treating the pretreated water at a primary water purification system and then at a subsystem, wherein the treatment at the primary water purification system comprises the steps of passing the pretreated water through a high-pressure reverse osmotic membrane separation unit; degassing the water passing through the membrane separation unit; decomposing organic substances contained in the degassed water at an ultraviolet oxidation unit; and treating the water after the decomposition of organic substances at an ion-exchange unit.

EXAMPLES

Now will be described the advantageous effects of the apparatus and method for producing ultrapure water of the present invention with reference to Examples and Comparative Examples. The present invention should not be limited by the Examples.

Example 1

Industrial water (electric conductivity: 30 mS/m, TOC: 2 mg/L, $SiO_2$: 10 mg/L, B: 30 µg/L) (treated by flocculation and filtration) (pH 6) was passed through a high-pressure reverse osmotic membrane (SWC4 Max, pure water flux: 0.78 $m^3/m^2$/day under an effective transmembrane pressure of 2.0 MPa and 25° C., NaCl removal rate: 99.8% under an effective pressure of 2.0 MPa, 25° C., and an NaCl concentration of 32,000 mg/L, manufactured by Nitto Denko Corporation) (recovery rate: 85%) and then passed through a degassing unit (degassing membrane, X-50, manufactured by Polypore International, Inc.), an ultraviolet oxidation unit (JPW, manufactured by PHOTOSCIENCE JAPAN CORP.), and DBP (Double-Bed Polisher, manufactured by Kurita Water Industries Ltd.; a single tower containing separate cation-exchange resin and anion-exchange resin layers) in this order.

Comparative Example 1

The raw water used in Example 1 was treated as in Example 1 except that the raw water was passed through two ultralow-pressure reverse osmotic membranes (RO membranes) connected in series (ES-20, pure water flux: 1 $m^3/m^2$/day under an effective pressure of 2.0 MPa and 25° C., NaCl removal rate: 99.7% under an effective pressure of 0.75 MPa, 25° C., and an NaCl concentration of 500 mg/L, manufactured by Nitto Denko Corporation) (recovery rate at the first stage: 85%, recovery rate at the second stage: 90%).

Comparative Example 2

The raw water used in Example 1 was passed through cationic tower No. 1 (resin brand name: EX-CG, manufactured by Kurita Water Industries Ltd.), a degassing unit (degassing membrane, X-50, manufactured by Polypore International, Inc.), anionic tower No. 1 (resin brand name: EX-AG, manufactured by Kurita Water Industries Ltd.), an ultralow-pressure reverse osmotic membrane (RO membrane) (ES-20, manufactured by Nitto Denko Corporation) (recovery rate: 90%), an ultraviolet oxidation unit (JPW, manufactured by PHOTOSCIENCE JAPAN CORP.), a mixed-bed ion-exchange unit (MB) (resin brand name: EX-MG, manufactured by Kurita Water Industries Ltd.), and a non-recycle ion-exchange unit (resin brand name: EX-MG, manufactured by Kurita Water Industries Ltd.) in this order. The degassing unit and the ultraviolet oxidation unit were installed in the same number as in Example 1.

Comparative Example 3

The raw water used in Example 1 was treated as in Example 1 except that the raw water was passed through a high-pressure reverse osmotic membrane unit (SWC4 Max, manufactured by Nitto Denko Corporation) (recovery rate: 85%), an ultraviolet oxidation unit (JPW, manufactured by PHOTOSCIENCE JAPAN CORP.), a degassing unit (degassing membrane, X-50, manufactured by Polypore International, Inc.), and DBP (Double-Bed Polisher, manufactured by Kurita Water Industries Ltd.; a single tower containing separate cation-exchange resin and anion-exchange resin layers) in this order.

Comparative Example 4

The raw water used in Example 1 was treated as in Example 1 except that the raw water was passed through a degassing unit (degassing membrane, X-50, manufactured by Polypore International, Inc.), a high-pressure reverse osmotic membrane unit (SWC4 Max, manufactured by Nitto Denko Corporation) (recovery rate: 85%), an ultraviolet oxidation unit (JPW, manufactured by PHOTOSCIENCE JAPAN CORP.), and DBP (Double-Bed Polisher, manufactured by Kurita Water Industries Ltd.; a single tower containing separate cation-exchange resin and anion-exchange resin layers) in this order.

Table 2 illustrates the results of evaluation on the qualities of the waters treated with the primary water purification systems in Example 1 and Comparative Examples 1 and 2.

TABLE 2

(the results of evaluation of the qualities on the waters treated with the primary water purification systems)

| Items | Example | Comparative Example 1 | Comparative Example 2 |
|---|---|---|---|
| Specific resistance | 18.2 MΩcm | 18.2 MΩcm | 18.2 MΩcm |
| TOC | 1.5 µg/L | 1.8 µg/L | 2 µg/L |
| B | <1 ng/L | <1 ng/L | <1 ng/L |
| $SiO_2$ | <0.1 µg/L | <0.1 µg/L | <0.1 µg/L |

The results illustrated in Table 2 demonstrate that the treated water in Example 1 exhibited a specific resistance, a boron (B) concentration, and a silica ($SiO_2$) concentration comparable to those of the treated water in Comparative Example 1 or 2, and exhibited the lowest total organic carbon (TOC) level.

FIG. 1 is a graph illustrating a variation in TOC level of water with time, the water being treated by the primary water purification system in Example 1 or Comparative Example 3 or 4.

As illustrated in FIG. 1, the treated water in Comparative 3 exhibited a TOC level higher by about 0.5 μg/L than that of the treated water in Example 1. The results demonstrate that the TOC decomposition efficiency in the ultraviolet oxidation unit varies depending on the order (position) of the installation of the degassing unit. As illustrated in FIG. 1, the quality of the treated water in Comparative Example 4 was comparable to that of the treated water in Example 1 at the initiation of the passing of water, but the water quality was lowered with the elapse of days. This phenomenon is probably attributed to the fact that the degassing efficiency is lowered by contamination of the degassing unit with raw water-derived substances, resulting in a reduction in efficiency of ultraviolet oxidation and decomposition.

The invention claimed is:

1. An apparatus for producing ultrapure water, comprising:
   a pretreatment system configured to treat industrial water, tap water, well water, or used ultrapure water discharged from electronic device plants and produce a pretreated water,
   a primary water purification system configured to treat the pretreated water, comprising a high-pressure reverse osmotic membrane separation unit, a degassing unit, an ultraviolet oxidation unit, and an ion-exchange unit in this order, and
   a subsystem comprising a low-pressure ultraviolet oxidation unit, a subsystem ion-exchange unit, and an ultrafiltration unit,
   wherein the high-pressure reverse osmotic membrane separation unit exhibits a pure water flux of 0.6 to 1.3 $m^3/m^2$/day under an effective transmembrane pressure of 2.0 MPa and 25° C.
   the ion-exchange unit in the primary water purification system is:
   A) a two-bed two-tower reusable ion-exchange unit comprising a cation-exchange tower filled with a strong-acid cation-exchange resin and an anion-exchange tower filled with a strong-base anion-exchange resin, the towers being connected in series;
   B) a two-bed one-tower reusable ion-exchange unit comprising a single tower filled with a strong-acid cation-exchange resin and a strong-base anion-exchange resin such that the resins are placed in different beds; or
   C) a reusable ion-exchange unit comprising one or more electric reusable deionization units connected in series,
   water discharged through an outlet of the primary water purification system exhibits a specific resistance of 18 MΩcm or more,
   a total organic carbon (TOC) concentration of 2 μg/L or less,
   a boron (B) concentration of 1 ng/L or less, and
   a silica ($SiO_2$) concentration of 0.1 μg/L or less.

2. A method for producing ultrapure water, the method comprising:
   treating industrial water, tap water, well water, or used ultrapure water discharged from electronic device plants at a pretreatment system, thereby producing a pretreated water, and
   treating the pretreated water at a primary water purification system and then at a subsystem, the subsystem comprising a low-pressure ultraviolet oxidation unit, a subsystem ion-exchange unit, and an ultrafiltration unit,
   wherein the treatment at the primary water purification system comprises the steps of:
   passing the pretreated water through a high-pressure reverse osmotic membrane separation unit which exhibits a pure water flux of 0.6 to 1.3 $m^3/m^2$/day under an effective transmembrane pressure of 2.0 MPa and 25° C.;
   degassing the water passing through the membrane separation unit;
   decomposing organic substances contained in the degassed water at an ultraviolet oxidation unit; and
   treating the water after the decomposition of organic substances at an ion-exchange unit, and
   the ion-exchange unit in the primary water purification system is:
   A) a two-bed two-tower reusable ion-exchange unit comprising a cation-exchange tower filled with a strong-acid cation-exchange resin and an anion-exchange tower filled with a strong-base anion-exchange resin, the towers being connected in series;
   B) a two-bed one-tower reusable ion-exchange unit comprising a single tower filled with a strong-acid cation-exchange resin and a strong-base anion-exchange resin such that the resins are placed in different beds; or
   C) a reusable ion-exchange unit comprising one or more electric reusable deionization units connected in series,
   water discharged through an outlet of the primary water purification system exhibits a specific resistance of 18 MΩcm or more,
   a total organic carbon (TOC) concentration of 2 μg/L or less,
   a boron (B) concentration of 1 ng/L or less, and
   a silica ($SiO_2$) concentration of 0.1 μg/L or less.

3. The apparatus according to claim 1, wherein the subsystem is arranged in a downstream side of the primary water purification system.

4. The apparatus according to claim 1, wherein the low-pressure ultraviolet oxidation unit comprises a low-pressure ultraviolet lamp emitting 185-nm light to decompose and remove organic substances in water by OH radicals generated through absorption of the 185-nm light.

5. The method according to claim 2, wherein the low-pressure ultraviolet oxidation unit comprises a low-pressure ultraviolet lamp emitting 185-nm light to decompose and remove organic substances in water by OH radicals generated through absorption of the 185-nm light.

6. The apparatus according to claim 1, wherein the ion-exchange unit in the primary water purification system is A) or B).

7. The method according to claim 2, wherein the ion-exchange unit in the primary water purification system is A) or B).

8. The apparatus according to claim 1, wherein the degassing unit is a membrane degassifier.

9. The method according to claim 2, wherein the degassing is conducted through a membrane degassifier.

10. The apparatus according to claim 1, wherein the high-pressure reverse osmotic membrane separation unit comprises a reverse osmosis membrane comprising a polyamide layer.

11. The method according to claim 2, wherein the high-pressure reverse osmotic membrane separation unit comprises a reverse osmosis membrane comprising a polyamide layer.

* * * * *